(12) United States Patent
Reuter

(10) Patent No.: US 7,302,882 B2
(45) Date of Patent: Dec. 4, 2007

(54) JUMP FORCE VACUUM BOOSTER

(75) Inventor: David F. Reuter, Beavercreek, OH (US)

(73) Assignee: Delphi Technologies, Inc., Troy, MI (US)

( * ) Notice: Subject to any disclaimer, the term of this patent is extended or adjusted under 35 U.S.C. 154(b) by 604 days.

(21) Appl. No.: 10/952,297

(22) Filed: Sep. 28, 2004

(65) Prior Publication Data

US 2006/0073049 A1    Apr. 6, 2006

(51) Int. Cl.
*F04B 39/10* (2006.01)
*F04B 53/10* (2006.01)

(52) U.S. Cl. .................... 91/376 R; 91/434; 60/552

(58) Field of Classification Search ........... 91/376 R, 91/369.1, 434, 552, 562
See application file for complete search history.

(56) References Cited

U.S. PATENT DOCUMENTS

| | | | |
|---|---|---|---|
| 2,826,041 A * | 3/1958 | Rike | 91/369.4 |
| 2,986,155 A * | 5/1961 | Doyle | 137/218 |
| 3,148,592 A * | 9/1964 | Schultz et al. | 91/49 |
| 3,661,054 A * | 5/1972 | Brown | 91/369.4 |
| 3,935,709 A | 2/1976 | Matheus et al. | |
| 4,024,713 A | 5/1977 | Ueda | |
| 4,107,926 A | 8/1978 | Adachi | |
| 4,109,464 A | 8/1978 | Wickland | |
| 4,110,985 A | 9/1978 | Gordon et al. | |
| 4,183,588 A | 1/1980 | Snyder | |
| 4,198,823 A | 4/1980 | Mathues et al. | |
| 4,199,940 A | 4/1980 | Mathues et al. | |
| 4,199,947 A | 4/1980 | Mathues et al. | |
| 4,199,948 A | 4/1980 | Mathues et al. | |
| 4,409,460 A | 10/1983 | Nishii et al. | |
| 4,458,490 A | 7/1984 | Newhouse | |
| 4,508,008 A | 4/1985 | Belart | |
| 4,538,503 A | 9/1985 | Hachiro | |
| 4,594,854 A | 6/1986 | Takeuchi et al. | |
| 4,756,390 A | 7/1988 | Meadows | |
| 4,776,645 A | 10/1988 | Seibert et al. | |
| 4,815,293 A | 3/1989 | Cadeddu | |
| 5,098,170 A | 3/1992 | Watanabe | |
| 5,185,915 A | 2/1993 | Osterday et al. | |
| 5,188,431 A | 2/1993 | Gautier | |
| 5,214,917 A | 6/1993 | Crumb et al. | |
| 5,289,682 A | 3/1994 | Gill et al. | |
| 5,477,681 A | 12/1995 | Tackett | |
| 5,477,939 A | 12/1995 | Childress | |
| 5,503,468 A | 4/1996 | Saffran | |

(Continued)

*Primary Examiner*—Igor Kershteyn

(57) ABSTRACT

The invention provides a method and apparatus wherein the apparatus includes a housing having a first end and a second end. The housing also includes a first aperture and a second aperture. The first aperture is positioned to communicate with a first fluid source at a first pressure. The second aperture is positioned to communicate with a second fluid source at a second pressure. The first pressure is greater than the second pressure. The apparatus also includes a first piston disposed in the housing. The first piston is moveable between the first and second ends. The first piston includes a front surface communicating with the second aperture and a back surface communicating with the first aperture. The first piston also includes a first passageway communicating with the front and back surfaces. The apparatus also includes a three-way valve fluidly disposed between the first aperture and the back surface and between the front surface and the back surface. The apparatus also includes an output rod immovably associated with the first piston and extending away from said front surface.

21 Claims, 2 Drawing Sheets

U.S. PATENT DOCUMENTS

| | | |
|---|---|---|
| 5,507,373 A | 4/1996 | Nguyen |
| 5,626,402 A | 5/1997 | Saffran |
| 5,704,694 A | 1/1998 | Kozakai |
| 5,711,585 A | 1/1998 | Tozu et al. |
| 5,967,628 A | 10/1999 | Abe et al. |
| 6,033,038 A | 3/2000 | Kulkarni et al. |
| 6,042,199 A | 3/2000 | Tobisawa |
| 6,065,290 A | 5/2000 | Verbo et al. |
| 6,089,140 A * | 7/2000 | Kobayashi et al. ........ 91/369.1 |
| 6,109,164 A | 8/2000 | Okuhara et al. |
| 6,164,183 A | 12/2000 | Fulks et al. |
| 6,203,120 B1 | 3/2001 | Urai et al. |
| 6,254,202 B1 | 7/2001 | Kawamoto |
| 6,364,429 B1 | 4/2002 | Roden et al. |
| 6,374,721 B1 | 4/2002 | Zehnder, II et al. |
| 6,398,316 B1 | 6/2002 | Mizutani et al. |
| 6,412,883 B1 | 7/2002 | Mizutani et al. |
| 6,422,660 B2 | 7/2002 | Tozu et al. |
| 6,443,535 B1 | 9/2002 | Crombez et al. |
| 6,612,660 B2 | 9/2003 | Mizutani et al. |
| 6,666,530 B2 | 12/2003 | Mizutani et al. |
| 6,739,676 B1 | 5/2004 | Isono et al. |
| 6,755,486 B2 | 6/2004 | Nishio et al. |

* cited by examiner

US 7,302,882 B2

JUMP FORCE VACUUM BOOSTER

FIELD OF THE INVENTION

The invention relates to a braking system for a vehicle and more particularly to vacuum booster for the brakes of the braking system.

BACKGROUND OF THE INVENTION

Vacuum boosters enhance braking operations of a vehicle. For example, in typical braking systems, a brake pedal is pressed by the driver to stop the vehicle. A piston in a master cylinder of the brake system moves in response to movement of the brake pedal and movement of the piston urges brake fluid to the individual calipers of the brake system. A vacuum booster is a structural arrangement that cooperates with the brake pedal to move the piston. In other words, the vacuum booster applies an additional force on the master cylinder piston that acts in parallel and is proportional with the force applied by the brake pedal. From the perception of the driver, the effort required to stop the vehicle is reduced.

SUMMARY OF THE INVENTION AND ADVANTAGES

The invention provides a method and apparatus wherein the apparatus includes a housing having a first end and a second end. The housing also includes a first aperture and a second aperture. The first aperture is positioned to communicate with a first fluid source at a first pressure. The second aperture is positioned to communicate with a second fluid source at a second pressure. The first pressure is greater than the second pressure. The apparatus also includes a first piston disposed in the housing. The first piston is moveable between the first and second ends. The first piston includes a front surface communicating with the second aperture and a back surface communicating with the first aperture. The first piston also includes a first passageway communicating with the front and back surfaces. The apparatus also includes a three-way valve fluidly disposed between the first aperture and the back surface and between the front surface and the back surface. The apparatus also includes an output rod immovably associated with the first piston and extending away from said front surface.

The exemplary embodiment of the invention enhances the operation of the braking system of a vehicle. The apparatus of the invention provides a booster that assists the driver in braking. The apparatus is less complex and costly than known boosting systems.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
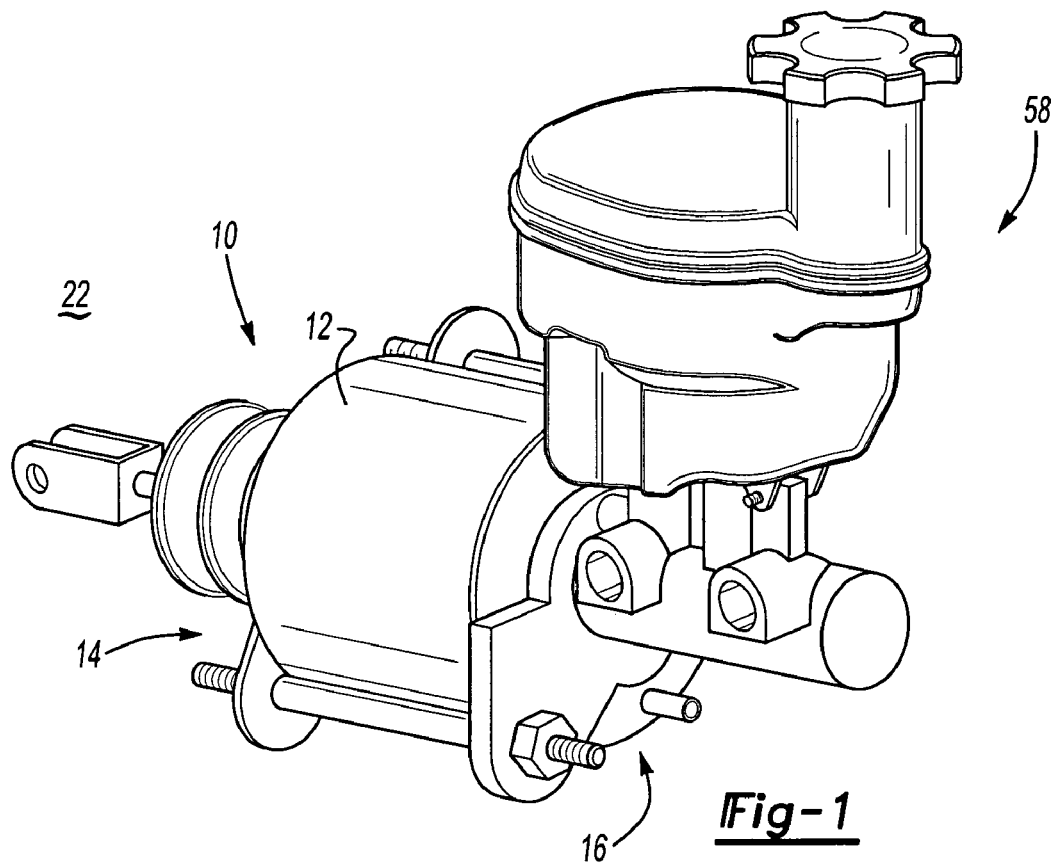
FIG. 1 is a perspective view of a first exemplary embodiment of the invention.
Figure 2:
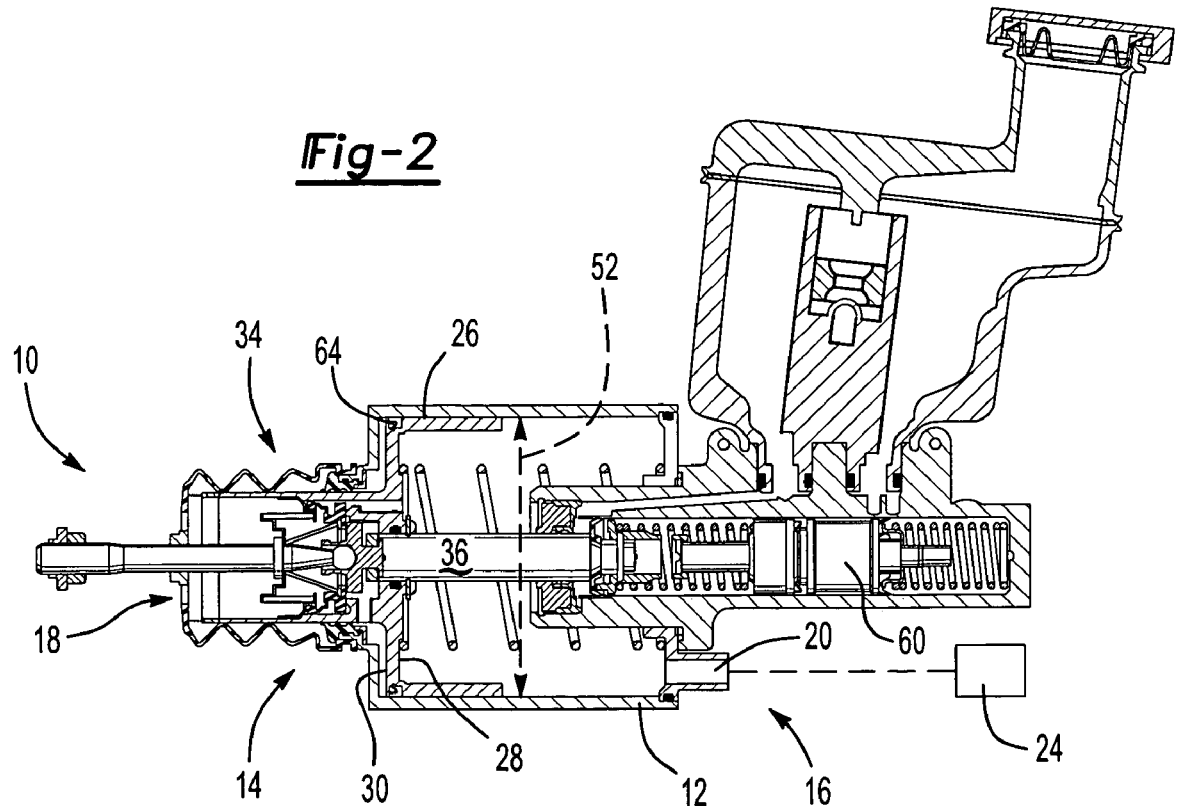
FIG. 2 is a cross-sectional view of the first exemplary embodiment of the invention taken along a longitudinal axis of the first exemplary embodiment.

Referring now to FIGS. 1-4, the invention provides a method and apparatus wherein the apparatus 10 includes a housing 12 having a first end 14 and a second end 16. In the exemplary embodiment of the invention, the housing is engaged with a master cylinder assembly 58 for a vehicle. The master cylinder assembly 58 houses a quantity of brake fluid that can be urged to individual calipers of the vehicles braking system. A piston assembly 60 is supported for movement by a main bore of the master cylinder assembly 58 and urges the brake fluid to the calipers.

The housing 12 also includes a first aperture 18 and a second aperture 20. The first aperture 18 is positioned to communicate with a first fluid source 22 at a first pressure. In the exemplary embodiment of the invention, the first pressure is atmospheric pressure. The second aperture 20 is positioned to communicate with a second fluid source 24 at a second pressure. The first pressure is greater than the second pressure. In the exemplary embodiment of the invention, the second pressure is vacuum. In alternative embodiments of the invention, the first pressure could be less than or greater than atmospheric pressure and the second pressure could be greater than vacuum. The housing 12 of the exemplary embodiment of the invention is shown as including a cylindrical body portion and cover, however, in alternative embodiments of the invention, the housing 12 could be unitary or could be formed from more than two portions.

The apparatus 10 also includes a first piston 26 disposed in the housing 12. The first piston 26 is moveable between the first and second ends 14, 16. The first piston 26 includes a front surface 28 communicating with the second aperture 20 and a back surface 30 communicating with the first aperture 18. The first piston 26 also includes a first passageway 32 communicating with the front and back surfaces 28, 30.

The apparatus 10 also includes a three-way valve 34 fluidly disposed between the first aperture 18 and the back surface 30 and between the front surface 28 and the back surface 30. The three-way valve 34 can be configured in a first orientation wherein the first passageway 32 is open between the front and back surfaces 28, 30, and is simultaneously closed between first aperture 80 and back surface 30, best shown in FIG. 3. Under typical operating conditions, when the three-way valve 34 is configured in the first orientation, the driver has ceased engaging the brake pedal and a vacuum is applied to both the front and back surfaces 28, 30 and the first piston 26 moves toward the first end 14. The three-way valve 34 can also be configured in a second orientation wherein the first passageway 32 is open between the back surface 30 and the first fluid source 22 that enters the device through aperture 18, and is simultaneously closed between back surface 30 and front surface 28, best shown in FIG. 4. Under typical operating conditions, when the three-way valve 34 is configured in the second orientation, the driver is engaging the brake pedal and a vacuum is maintained on the front surface 28. Simultaneously, fluid at a higher-than-vacuum pressure is applied to the back surface 30 and the first piston 26 moves toward the second end 16 as caused by the force created from the differential pressures between the two sources acting on piston 26.

The apparatus 10 also includes an output rod 36 immovably associated with the first piston 26 and extending away from said front surface 28. The output rod 36 extends to engage, directly or indirectly, the piston assembly 60 of the master cylinder assembly 58. The first piston 26 and output rod 36 are engaged with one another with a clip 62. A sealing member 40 is sealingly disposed between the first piston 26 and output rod 36.

In the exemplary embodiment of the invention, the first piston 26 includes a third aperture 38. The third aperture extends through the first piston and the output rod 36 is received in the third aperture 38. The sealing member 64 is disposed in the third aperture 38 and seals the first piston 26 with respect to the output rod 36.

In the exemplary embodiment of the invention, the three-way valve 34 includes a second sealing member 42 and a second piston 44. The second sealing member 42 is moveable between an open position spaced away from the first passageway 32 and a closed position spaced towards the first passageway 32. The second sealing member 42 is shown in the open position in FIG. 3 and shown in the closed position in FIG. 4. In the open position second sealing member 42 is in contact with second piston 44 and spaced away from piston 26, which closes the defined passageway 46 between aperture 18 and back surface 30, and opens the defined first passageway 32 between back surface 30 and front surface 28. In the closed position second sealing member 42 is in contact with piston 26 and spaced away from second piston 44, which closes the defined passageway 32 between back surface 30 and front surface 28, and opens the defined second passageway 46 between aperture 18 and back surface 30.

Figure 3:
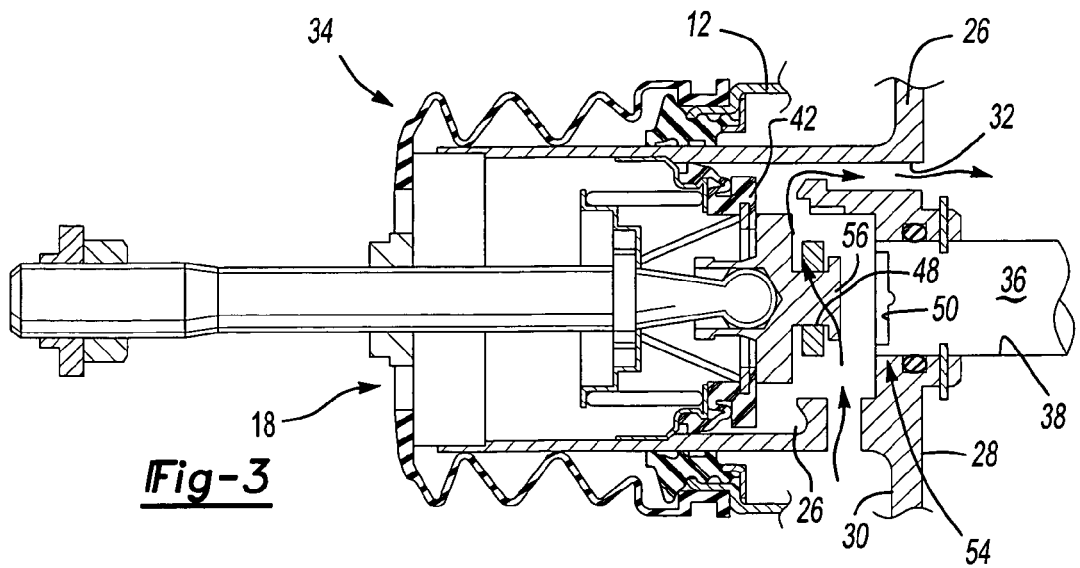
FIG. 3 is an enlarged cross-sectional view of the first exemplary embodiment wherein a three-way valve is shown in a first position.
Figure 4:
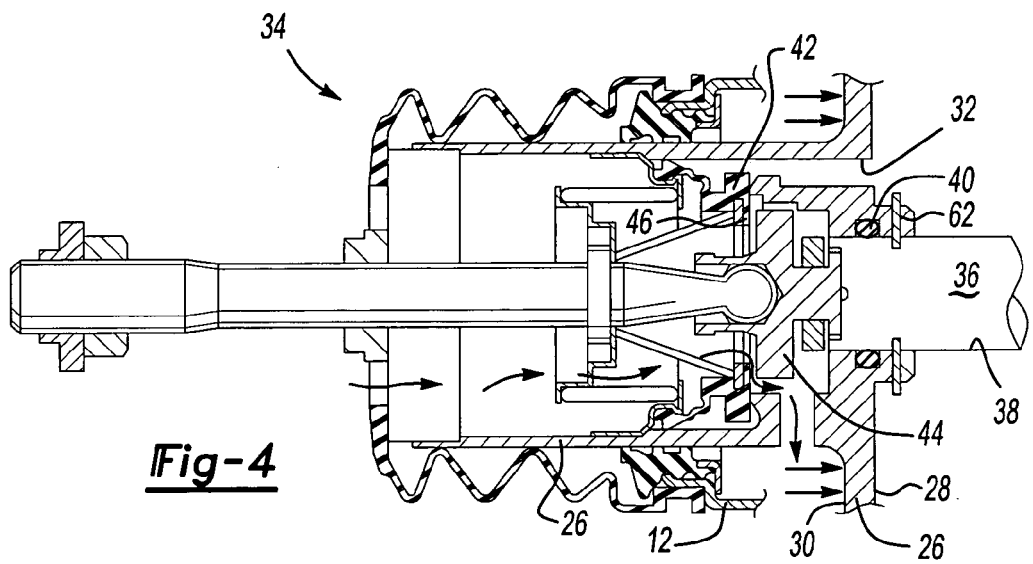
FIG. 4 is an enlarged cross-sectional view of the first exemplary embodiment wherein the three-way valve is shown in a second position.

The second piston 44 is moveable between first and second positions, the first position shown in FIG. 3 and the second position shown in FIG. 4. The second piston 44 contacts the output rod 36 when in the second position, when the second passageway 46 is open and passageway 32 is closed. Under typical operating conditions, the second piston 44 moves in response to movement of the brake pedal by the driver. The second piston 44 contacts the output rod 36 and urges both the first piston 26 and the output rod 36 toward the second end 16. In the exemplary embodiment of the invention, the second piston 44 includes a first surface 48 and the output rod 36 includes a second surface 50. The first surface 48 and the second surface 50 contact one another when said second piston 44 is in the second position.

In the exemplary embodiment of the invention, the first piston (26) is formed from a substantially rigid material. The first piston (26) can be formed from metal, plastic or any other rigid material. The housing 12 defines an interior cross-section 52 and the first piston 26 occupies substantially all of the interior cross-section 52. An elastomeric sealing member 64 is disposed between the first piston 26 and the housing 12. A highly efficient, low drag force lip seal is shown, but other types of sealing devices may also be effectively utilized. Unlike known boosters, the apparatus 10 does not include a deformable diaphragm, the first, rigid piston 26 substantially directly engaging the housing for sliding movement. The back surface 30 extends transverse with respect to the output rod 36, extending perpendicular to the output rod 36 in the exemplary embodiment of the invention, to provide a constant surface area subjected to fluid at the first pressure.

A method is provided by the invention and includes the step of disposing the housing 12 in communication with the first fluid source 22 at a first pressure and a second fluid source 24 at a second pressure. The method also includes the step of disposing the first piston 26 in the housing 12 for movement between the first and second ends 14, 16. The method also includes the step of fluidly disposing the three-way valve 34 between the first aperture 18 and the back surface 30 and between the front surface 28 and the back surface 30. The method also includes the step of immovably associating the first piston 26 with the output rod 36, which extends away from the front surface 28.

In the exemplary embodiment of the invention, the method can also include the step of opening a portion of the three-way valve 34 between the first aperture 18 and the back surface 30 to communicate fluid at the first pressure to the back surface 30 during movement of the first piston 26 from the first end 14 to the second end 16 while simultaneously closing a portion of the three-way valve between the back surface 30 and front surface 28 to stop communication to fluid at the second pressure. Communicating fluid at the first pressure to the back surface 30 while simultaneously stopping communication to the front surface, allows creation of a pressure differential that enhances movement of the first piston 26 from the first end 14 to the second end 16 during braking. For example, the fluid applies pressure to the back surface 30 and cooperates with force applied by the driver of the vehicle.

In the exemplary embodiment of the invention, the method can also include the step of maintaining a constant size of the back surface 30 during movement of the first piston 26 from the first end 14 to the second end 16. By maintaining a constant area of the back surface, the force applied by the fluid at the first pressure will be constant, being a product of pressure multiplied by area.

Figure 5:
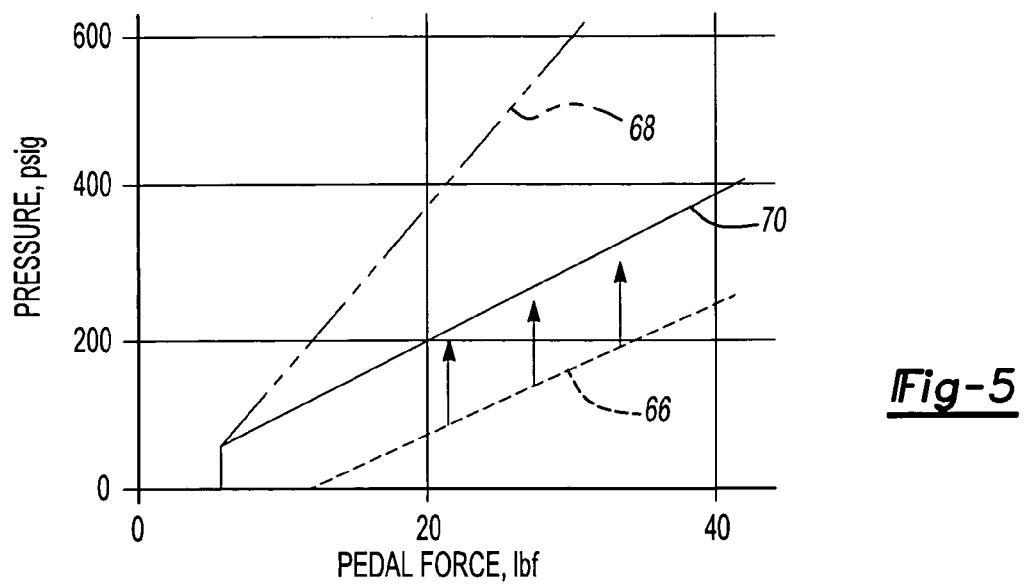
FIG. 5 is a graph illustrating the operation of the braking system (1) without boosting means, (2) incorporating the first exemplary embodiment of the invention, and (3) incorporating a prior art vacuum booster.

The operating effects of the apparatus and method of the invention are illustrated in FIG. 5. Line 66 illustrates the typical operation of a braking system without a booster. The brake pressure applied at the calipers increases linearly in response to changes in pedal force. Line 66 also demonstrates that a quantity of force that must be applied before braking pressure begins to build, approximately 15-17 lbs. in the graph. Line 68 illustrates the typical operation of a braking system with a well-known booster. Braking pressure increases at a greater rate in response to changes in the pedal force. In other words, the well-known booster applies an increasing amount of force in response to the driver applying an increasing amount of pedal force due to its well-understood proportional feedback mechanism and its much larger diaphragm area. Line 68 also demonstrates that a quantity of force must be applied before braking pressure begins to build. However, the well-known booster reduces the quantity of initial force with respect to a non-boosted system, approximately 5-7 lbs. versus 15-17 lbs. Line 70 illustrates the operation of a braking system with a booster according to the exemplary embodiment of the invention. The driver-perceived effects of the apparatus 10 are similar to the well-known booster in that the quantity of initial force required to begin building brake pressure is reduced with respect to a non-boosted system, approximately 5-7 lbs. versus 15-17 lbs. However, effects of the apparatus 10 are different from well-known booster as the driver applies increasing pedal force. The forces applied by the apparatus 10 do not change as the driver applies increasing pedal force. The slope of the line is not changed, rather, the line is shifted by the amount of boosting force applied the apparatus 10.

In the exemplary embodiment of the invention, the method can also include the step of directly engaging the output rod 36 with the three-way valve 34. The second piston 44 of the three-way valve 34 engages the out put rod 36. In well-known, more complex boosters, a rubber reaction disc is typically disposed between the second piston 44 and the out put rod 36.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An apparatus comprising:
   a housing having a first end and a second end and a first aperture and a second aperture, wherein said first aperture being positioned to communicate with a first fluid source at a first pressure and said second aperture being positioned to communicate with a second fluid source at a second pressure less than the first pressure;
   a first piston moveably disposed in said housing and having a front surface facing said second aperture and a back surface facing said first aperture and a first passageway extending between said front and back surfaces;
   a three-way valve controlling flow through said first passageway between said first aperture and said back surface and between said front surface and said back surface; and
   an output rod extending away from said front surface and fixedly connected to said first piston.

2. The apparatus of claim 1 wherein said first piston further comprises:
   a third aperture, said output rod being received in said third aperture.

3. The apparatus of claim 2 further comprising:
   a first sealing member disposed between said third aperture and said output rod.

4. The apparatus of claim 1 wherein said three-way valve further comprises:
   a second sealing member moveable between an open position opening said first passageway between said front and back surfaces and a closed position closing said first passageway between said front and back surfaces; and
   a second piston cooperating with said second sealing member to define a second passageway extending between said first aperture and said back surface when said second sealing member is in said closed position.

5. The apparatus of claim 4 wherein said second piston is moveable between a first position contacting said second sealing member and a second position spaced from said second sealing member and contacting said output rod.

6. The apparatus of claim 5 wherein said second piston includes a first surface and said output rod includes a second surface, wherein said first surface and said second surface contact one another when said second piston is in said second position.

7. The apparatus of claim 1 wherein said first piston is formed from a substantially rigid material.

8. The apparatus of claim 7 wherein said housing defines an interior cross-section and said first piston occupies substantially all of said interior cross-section.

9. The apparatus of claim 8 wherein said back surface extends transverse with respect to said output rod.

10. The apparatus of claim 9 wherein said back surface extends perpendicular with respect to said output rod.

11. An apparatus comprising:
    a master cylinder assembly of a vehicle braking system;
    a housing engaged with said master cylinder assembly having a first end and a second end and a first aperture and a second aperture, wherein said first aperture being positioned to communicate with a first fluid source at a first pressure and said second aperture being positioned to communicate with a second fluid source at a second pressure less than the first pressure, said housing also defining an interior cross-section;
    a first piston moveably disposed in said housing and having a front surface facing said second aperture and a back surface facing said first aperture and a first passageway extending between said front and back surfaces, said first piston rigidly occupying substantially all of said interior cross-section to fluidly isolate said first and second apertures with respect to one another;
    a three-way valve controlling flow through said first passageway between said first aperture and said back surface and between said front surface and said back surface; and
    an output rod extending away from said front surface and fixedly connected to said first piston.

12. The apparatus of claim 11 wherein said first piston is plastic.

13. The apparatus of claim 12 wherein said first piston defines a third aperture extending between said front surface and said first passageway, said output rod being received in said third aperture.

14. The apparatus of claim 13 wherein said three-way valve further comprises:
    a second sealing member moveable between an open position opening said first passageway between said front and back surfaces and a closed position closing said first passageway between said front and back surfaces; and
    a second piston cooperating with said second sealing member to define a second passageway extending between said first aperture and said back surface when said second sealing member is in said closed position, said second piston moveable to directly contact said output rod.

15. The apparatus of claim 14 wherein said output rod defines a blind aperture sized to substantially similar to a portion of said second piston, said portion received in said blind aperture when said second piston is in said second position.

16. The apparatus of claim 14 wherein said second piston is spaced from said first piston at said first position and at said second position.

17. A method comprising the steps of:
    disposing a housing in communication with a first fluid source at a first pressure and a second fluid source at a second pressure less than the first pressure, wherein the housing has a first end and a second end and a first aperture and a second aperture, the first aperture communicating with the first fluid source and the second aperture communicating with the second fluid source;

disposing a first piston in the housing for movement, the first piston having a front surface facing the second aperture and a back surface facing the first aperture and a first passageway extending between the front and back surfaces;

controlling flow through the first passageway between the first aperture and the back surface and between the front surface and the back surface with a three-way valve; and fixedly connecting the first piston with an output rod extending away from the front surface.

18. The method of claim 17 including the step of:

opening a portion of the three-way valve between the first aperture and the back surface to communicate fluid at the first pressure to the back surface during movement of the first piston from the first end to the second end while simultaneously closing a second portion of the three-way valve between the front surface and back surface to stop communication of fluid at the second pressure.

19. The method of claim 18 including the step of:

maintaining a constant size of the back surface during movement of the first piston from the first end to the second end.

20. The method of claim 19 including the step of:

directly engaging the output rod with the three-way valve.

21. The method of claim 20 including the step of:

sealing the first piston relative the housing during movement of the first piston with a lip seal.

* * * * *